Jan. 2, 1923.
F. H. GEORGE.
BELT.
FILED DEC. 1, 1920.
1,440,980
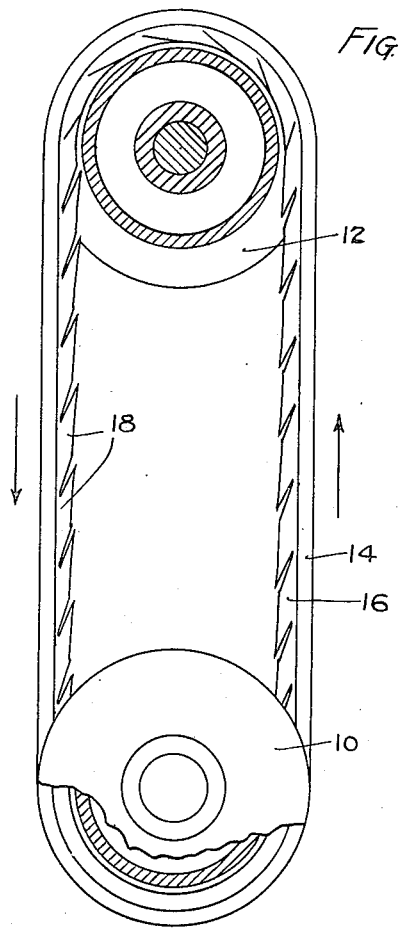
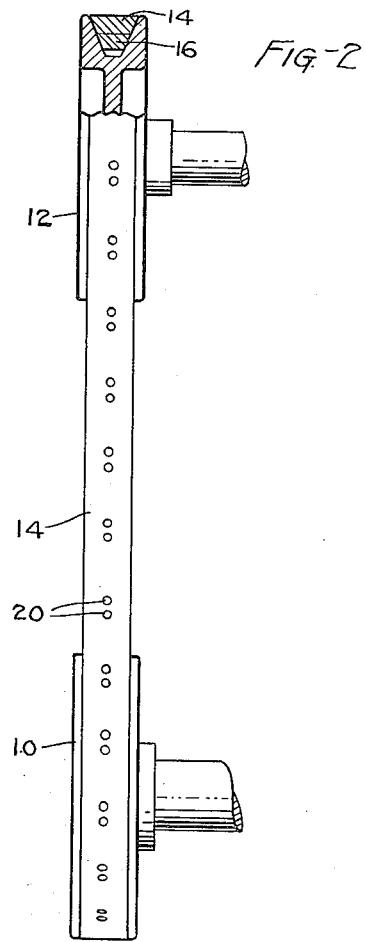
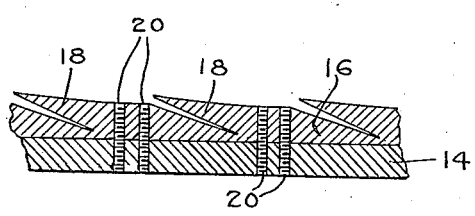
INVENTOR:
FREDERICK H. GEORGE.
BY Whiteley and Ruckman
ATTORNEYS.

Patented Jan. 2, 1923.

1,440,980

UNITED STATES PATENT OFFICE.

FREDERICK H. GEORGE, OF MINNEAPOLIS, MINNESOTA.

BELT.

Application filed December 1, 1920. Serial No. 427,488.

*To all whom it may concern:*

Be it known that I, FREDERICK H. GEORGE, a citizen of the United States, residing at Minneapolis, in the county of Hennepin and State of Minnesota, have invented certain new and useful Improvements in Belts, of which the following is a specification.

My invention relates to belts, and an object is to provide a belt having great flexibility combined with the absence of tendency to break down while flexed in passing around pulleys. Another object is to provide a belt which will have an efficient gripping action while passing around pulleys.

The full objects and advantages of my invention will appear in connection with the detailed description thereof, and the novel features embodied in my inventive idea will be particularly pointed out in the claims.

In the accompanying drawings, Fig. 1 is a view partly in side elevation and partly in section showing my belt passing around pulleys. Fig. 2 is a view at right angles to the position shown in Fig. 1 and is mostly in front elevation but is in section at the upper portion. Fig. 3 is a longitudinal sectional view of a portion of the belt.

The particular embodiment illustrated in the drawings shows the belt applied for use in driving fans which are used in automobiles. The belt is shown as an endless belt running over pulleys 10 and 12 having V-shaped grooves in their peripheries. The belt which is preferably of leather is shown as a two-ply belt having an outer ply 14 and an inner ply 16 cemented together but more than two plies may be employed if desired. When the belt is used in connection with pulleys of the character shown, it is made V-shape as shown at the upper portion in Fig. 2 so that the inclined edges of the belt will grip the inclined edges of the grooves in the pulleys with the inner surface of the belt out of contact with relation to the bottom of the grooves. As shown in Figs. 1 and 3, the belt is provided at regular intervals with inclined slits extending from the inner surface into the inner ply 16 but preferably not quite reaching the outer ply 14. In providing these slits, it is not necessary or desirable to remove any of the material of the belt. Flap members 18 are thus formed and these flap members are securely fastened to the outer ply 14 by suitable fasteners 20, there being preferably two of these fasteners extending through each of the flap members 18 and the outer ply 14, as shown in Fig. 3. It will be obvious from this latter figure that this flap construction may be embodied in flat belts as well as in V-shape belts.

The operation and advantages of my invention will be readily understood from the foregoing description. In use, the belt is applied in such manner as to run in the direction indicated by the arrows in Fig. 1 so that the slits are always directed away from the direction in which the belt is traveling with the result that there is no tendency of the sharp edges of the flap members to become doubled or folded back upon themselves when the belt is passing over the pulleys. The provision of the slits impart much greater flexibility of the belt and when the belt passes over a pulley it is obvious from the upper portion of Fig. 1 that the flap members are squeezed together so that the belt is maintained in an exact arc of a circle with no tendency to break down and tear off the flaps. When the belt runs in a V-groove as shown at the upper portion of Fig. 2, the inclined edges of the belt have an extremely efficient gripping action upon the inclined edges of the grooves.

I claim:

1. A belt having its edges inclined to form a V-shape cross-section and having a plurality of transversely inclined slits in the material thereof extending from the narrow surface toward the wider surface.

2. A plural-ply belt having its edges inclined to form a V-shape cross-section and having a plurality of transversely inclined slits extending substantially through the material of the narrow ply to form flap members, and fasteners extending through said flap members and the wider ply.

3. A plural-ply belt having a plurality of inclined transverse slits extending substantially through the material of the inner ply to form flap members and fasteners extending through said flap members and the outer ply whereby said flap members will fit together in the form of an arc of a circle when the belt passes around a pulley.

In testimony whereof I hereunto affix my signature.

FREDERICK H. GEORGE.